United States Patent
Miszczak et al.

[11] Patent Number: 5,934,682
[45] Date of Patent: Aug. 10, 1999

[54] HEAD GASKET WITH PREFLATTENED WIRE RINGS AND METHOD OF MAKING AND USING SAME

[75] Inventors: Edward Miszczak, Frankfort; Edward Locke, Bolingbrook, both of Ill.

[73] Assignee: Fel-Pro Incorporated, Skokie, Ill.

[21] Appl. No.: 08/858,673

[22] Filed: May 19, 1997

[51] Int. Cl.⁶ .................................................. F02F 11/00
[52] U.S. Cl. .......................... 277/313; 277/593; 277/601; 29/888.3
[58] Field of Search ................... 140/82; 29/888.06, 29/888.3; 277/591, 593, 594, 595, 598, 600, 601, 313

[56] References Cited

U.S. PATENT DOCUMENTS

| | | | |
|---|---|---|---|
| 3,532,349 | 10/1970 | Czernik | 277/598 |
| 3,606,361 | 9/1971 | Pohl et al. | 277/601 |
| 3,626,994 | 12/1971 | Klenz | 140/82 |
| 4,311,318 | 1/1982 | Czernik et al. | 277/598 |
| 4,331,336 | 5/1982 | Czernik et al. | 277/592 |
| 4,450,800 | 5/1984 | Kotauschek | 277/591 X |
| 4,480,844 | 11/1984 | Kozerski | 277/591 |
| 4,518,168 | 5/1985 | Belter | 277/601 |
| 4,817,969 | 4/1989 | McDowell et al. | 277/595 |
| 5,076,592 | 12/1991 | Pearlstein | 277/593 |
| 5,120,078 | 6/1992 | Udagawa | 277/591 |
| 5,277,433 | 1/1994 | Ishikawa et al. | 277/593 |
| 5,306,023 | 4/1994 | Udagawa | 277/601 |
| 5,341,779 | 8/1994 | Chen et al. | 277/601 X |
| 5,454,574 | 10/1995 | Willis et al. | 277/591 |
| 5,683,092 | 11/1997 | Ito et al. | 277/601 |

*Primary Examiner*—Lynne Reichard
*Assistant Examiner*—Greg Binda
*Attorney, Agent, or Firm*—Brinks Hofer Gilson & Lione

[57] ABSTRACT

A head gasket and method for making and using the same is provided wherein the head gasket includes a wire ring which has been preflattened. The preflattened ring facilitates broad load distribution and is preferably used in an internal combustion engine having a bi-metallic engine block-head arrangement wherein the head is composed of a soft metal.

14 Claims, 3 Drawing Sheets

H C S

C L B

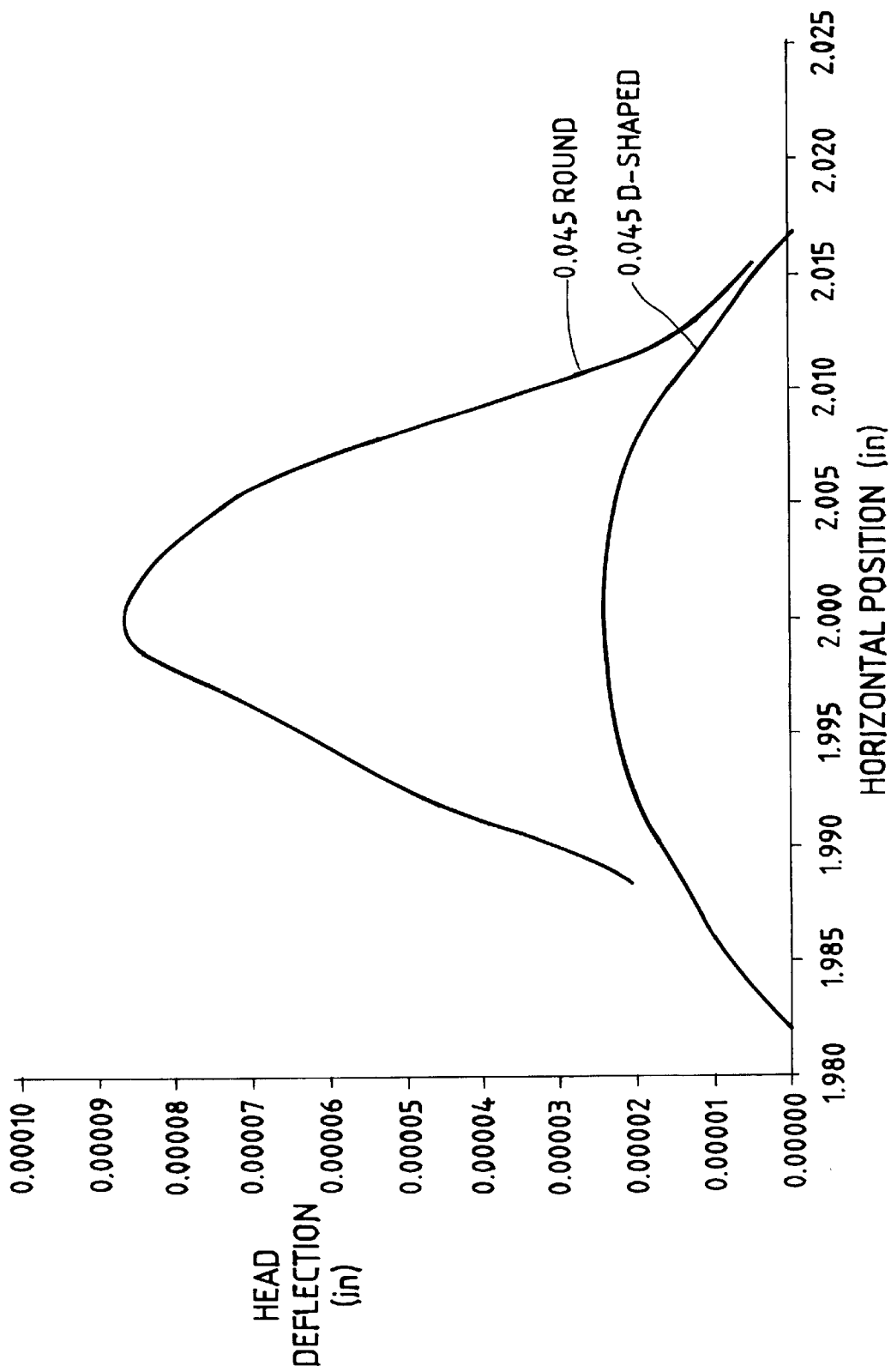

HEAD GASKET WITH PREFLATTENED WIRE RINGS AND METHOD OF MAKING AND USING SAME

BACKGROUND OF THE INVENTION

For many years now cylinder head gaskets have been designed to employ armoring and wire rings at the combustion openings to facilitate sealing of the combustion cylinders. For many reasons, the sealing of combustion openings can be difficult to accomplish. A variety of techniques and types of armoring and wire rings have been employed to enhance the sealing effect of cylinder head gaskets at the combustion openings.

In recent times, the difficulty of sealing off combustion openings has increased, for example, in situations where bi-metallic engines, such as those having an aluminum cylinder head and a cast iron cylinder block, are used. Bi-metallic engines are inherently more difficult to seal than are all cast-iron engines, and they become even more difficult to seal when the cylinders are closely arrayed and where the cooling of localized zones of the cylinder head and cylinder block is relatively poor.

A variety of approaches to enhancing the sealing effect of head gaskets at combustion openings in bi-metallic engines have been attempted. Yet, the problems resulting from the use of bi-metallic and lighter weight engines still resist efforts at their elimination, and a need still remains for a sealing means that will resist over-compression, and yet will not so indent or imbed into the softer aluminum engine head that the seal fails, such as on start-up when the engine is cold, or under other conditions under which failures and leakage are too often encountered today.

Thus it would be desirable to provide a cylinder head gasket which requires minimum changes from conventionally used constructions, but which responds to the more difficult sealing requirements imposed by bi-metallic and lighter weight engines, such as those in which the cylinders are more closely arrayed and which are so structured that some localized overheating occurs, thereby threatening the integrity of the combustion seal.

SUMMARY OF THE INVENTION

In accordance with the present invention, an improved head gasket for sealing confronting surfaces of a head and block around a combustion cylinder is provided. The head gasket comprises a generally flat laminated main gasket body defining at least one combustion opening for surrounding a combustion cylinder and, positioned secured in the combustion opening, a fire ring, the fire ring comprising a wire ring. The wire ring is made from a circular wire which has a preflattened upper surface for facing a head, and a lower surface, the lower surface being generally curvilinear in cross-section. The preflattened upper surface is flattened to a flatness which is at least ten percent greater than the flatness produced by loading the wire at the maximum load to which the head gasket is designed to be loaded. Alternatively, the wire flatness may be at least equal to 25% of the wire diameter. Desirably, the preflattened wire is ensheathed in a U-shape armor which supports the wire in the combustion opening.

The invention further comprises a method of making a head gasket for an internal combustion engine, the method comprising the steps of providing a head gasket body having upper and lower surfaces and defining a combustion opening therein, providing a generally circular annular wire ring for surrounding the combustion opening, flattening the upper surface of the annular wire ring while preventing the lower surface of the annular wire sealing ring from like flattening, and disposing the preflattened ring in the combustion opening, whereby the wire ring upper surface lies in a plane which is generally parallel to the upper sealing surface of the gasket body. In a preferred form of the method, the preflattening step comprises preflattening the upper wire surface to a flatness which is at least ten percent greater than the flatness which would be produced by loading a circular wire at the maximum design load in the application in which the head gasket is to be used or which has a flat portion which, in transverse dimension, is at least 25% of the diameter of the circular, annular wire. Preferably, the wire is ensheathed in a U-shaped armor which is disposed in the combustion opening, and the gasket as made is installed in an engine having a bi-metallic combustion sealing joint, such as a cast iron block and an aluminum engine head with the preflattened surface facing in the direction of the softer member.

Further objects, features and advantages of the present invention will become apparent from the following description and drawings.

BRIEF DESCRIPTION OF THE DRAWINGS

FIG. 7 is a plot of the amount of deflection of an aluminum head as a function of the horizontal position on a round wire and a D-shaped wire.

DETAILED DESCRIPTION

Figure 1:
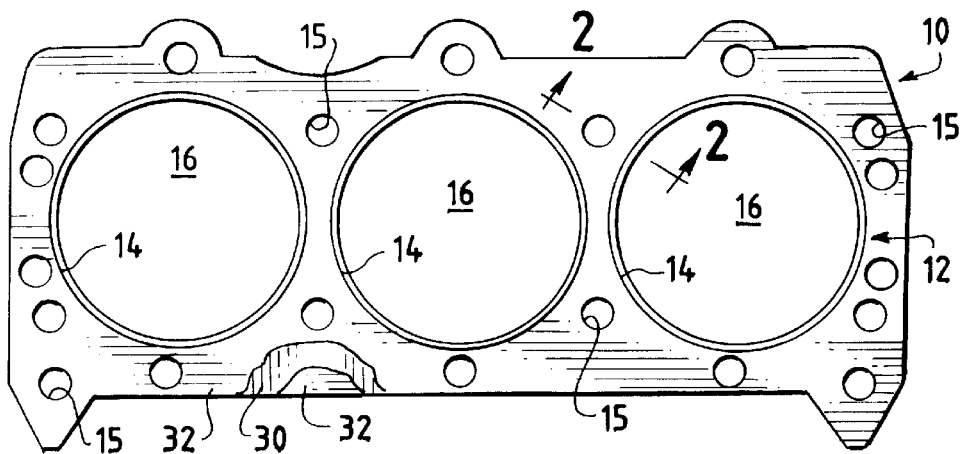
FIG. 1 is a plan view of a typical head gasket employing the principles of the present invention.
Figure 2:
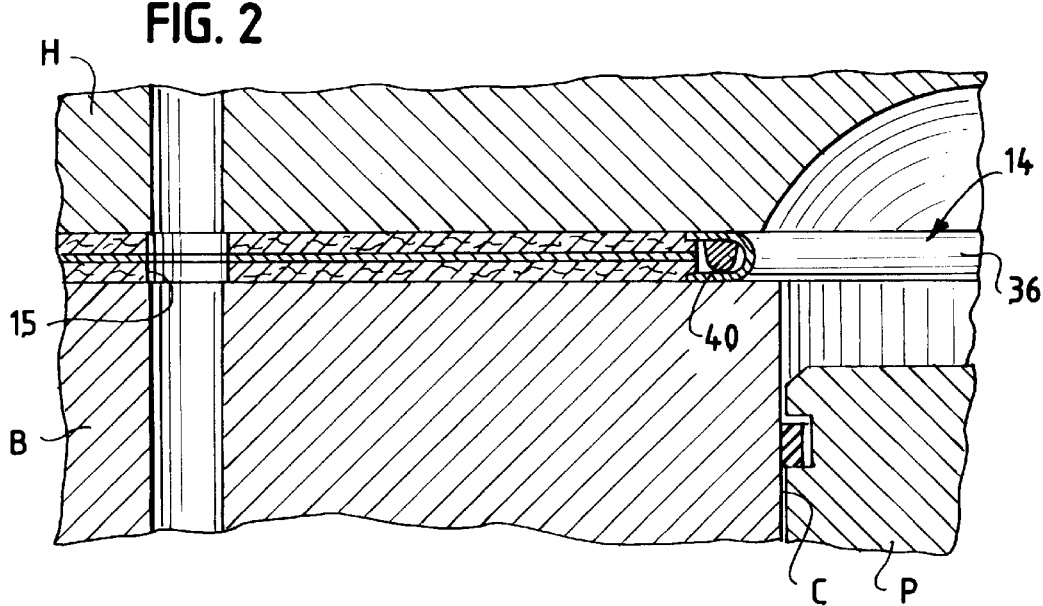
FIG. 2 is a cross-sectional view of the head gasket of FIG. 1 taken substantially along line 2—2 of FIG. 1.
Figure 3:
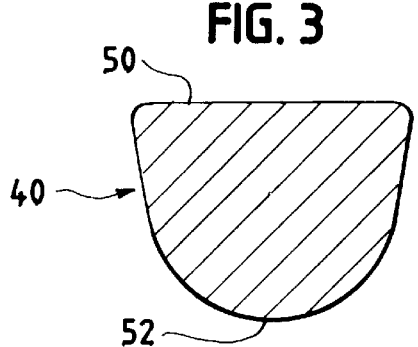
FIG. 3 is an enlarged cross-sectional view of a portion of the head gasket of FIG. 1, also taken along line 2—2 of FIG. 1.

Referring first to FIGS. 1–3, a head gasket assembly 10 of the present invention is seen to comprise a generally flat main gasket body 12 which defines a plurality of combustion openings 16, suitable oil, water and bolt openings 15, and armoring 14 for the combustion openings 16. In FIG. 1 a typical head gasket assembly 10 having three combustion openings 16 is shown for use in sealing an engine cylinder block B having cylinder bores C for pistons P and a cylinder head H (FIG. 2), typically for one side of a V-6 configuration engine.

The main gasket body 12 typically may comprise a laminate, such as of an imperforate or solid metallic core 30, and a pair of self-sustaining facings or facing sheets 32. Core 30 may be a steel core. Facing sheets 32 are typically of a fiber reinforced composite and are laminated to core 30. The most frequently used facings incorporate glass, aramid or other fibers and utilize nitrile, and employ neoprene or polyacrylic elastomers to form the facings. In the embodiment illustrated, the facings may have a thickness of about 0.015 inch, although, of course, this may vary with the application. Facing sheets 32 generally resist degradation by oils and coolants, retain torque, minimize extrusion, and exhibit heat resistance.

The main gasket body 12 is die cut or blanked out, such as with a stamping machine, punch press or other suitable form of equipment to provide the requisite number of combustion openings, bolt holes and a plurality of fluid flow passageways, such as oil and water passageways 15. A typical gasket assembly body 12 having the configuration shown in FIG. 1 may have a thickness of about 0.040 inch. Other configurations and thicknesses may be used depending upon the configuration and requirements of the engine with which a particular gasket assembly is to be used.

In the embodiment of FIGS. 1 and 2, armoring 14 is seen to comprise an annular body 36, as of steel, in which a wire ring 40 is positioned. Body 36 is generally U-shaped in cross-section and may be formed about the wire ring 40 in a known and conventional manner. Armor body 36 is disposed to surround the combustion chamber or combustion cylinder bore C in a conventional way. Wire ring 40 is disposed in a usual position occupied by a wire ring, namely closely adjacent to the closed end of the armor body 36, as is seen clearly in FIG. 2. The armor body 36 may be positioned to float in the opening, as by a series of support tabs, such as in the manner described and illustrated in U.S. Pat. No. 4,331,336, or may fully overlap the adjacent edges of the main gasket body as is conventional in the art. In either case, the armor body is adapted to ensheath and surround a wire ring 40 of the present invention.

The cross-section of a typical wire ring 40 in accordance with the present invention is best seen in FIG. 3. As there seen, the wire is "preflattened," such as from a typical round wire having a cross-sectional shape which is essentially circular in cross-section, such as of the type conventionally employed as wire rings. Conventional wire rings are typically formed of drawn round wire, which wire is formed into a ring of the desired diameter and then butt-welded, and rings formed in such a conventional manner may be employed in accordance with the present invention. If such a conventionally made ring is used, after its fabrication it is preflattened so that one side of the ring, the side which will confront the softer member of the bi-metallic combustion sealing joint, in this case the head, will be flat, while the other side, which faces the other harder member, the block, will have its typical curved surface which, if placed in contact with the block would initially provide line contact therewith along a circular path. By contrast, the wire ring of the present invention, if placed in contact with the cylinder head, will initially provide a wide band of contact along a circular path.

Figure 4A:
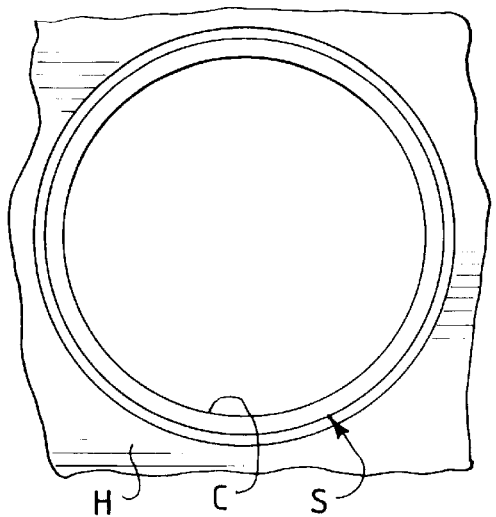
FIGS. 4A and 4B are views showing the areas of contact which a wire ring of FIG. 3 would make with flat surfaces around the combustion openings in a head and block, respectively.
Figure 4B:
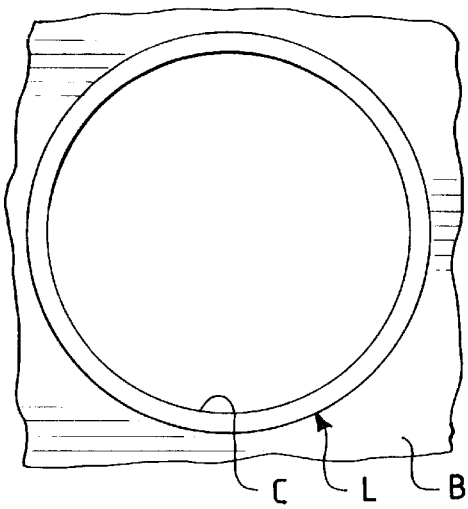

This is typically illustrated by FIGS. 4A and 4B. FIGS. 4A and 4B represent, respectively, a segment of an engine head H and an engine block B, each of which has a cylinder opening C in the block and head. In FIG. 4A the cylinder opening C in head H is circumscribed by a circular surface which represents the wide circular band or surface S of contact which a wire ring of the present invention laid against the head would generate. By contrast, FIG. 4B shows a block B with a cylinder opening C which is circumscribed by a circular line L of contact which the wire ring of the present invention laid against the block would generate.

Of course, FIG. 4A and 4B are representational of this because, it will be understood, the wire ring, in the illustrated embodiment, is ensheathed in the armor 36. Nevertheless, the loads applied as a gasket of the present invention is torqued down between the confronting head H and block B are concentrated along the respective upper and lower surfaces of the wire ring 40, so that the respective loads applied are distributed very differently against the head and block than they are with typical prior art, round wires or like wire rings which have essentially identical footprints, before loading, at each of the upper and lower surfaces of the ring.

To produce the footprints described, a wire ring 40 of the present invention is substantially preflattened on one side so that there will be a wide flat band or surface facing the head while the footprint of the other side, the side facing the block, is either a line or much narrower than the wide flat surface. The width of the wide flat surface is substantially greater than that which would be produced by placing a circular wire ring of the same diameter and hardness between a pair of parallel hardened flanges and applying the same maximum applied load to be used in the targeted application and is substantially wider than any flat surface on the other side of the ring, and preferably at least ten percent greater than that which would be produced by such loading. Thus, under such flattening conditions, the length of the line 50 in FIG. 3 (the length as seen in cross-section), will preferably always exceed by at least 10%, the length of the flat produced at the opposite lower side 52 when the wire 40 is compressed between a pair of hardened flanges at the maximum load in the application for which the wire is to be used. Alternatively, the flat dimension, in transverse cross-section, may be at least 25% of the diameter of the annular round wire.

As an example, a typical annular wire ring of carbon steel, initially of a diameter of 0.045 inch, was preflattened at the upper surface while preventing the lower surface of the wire from flattening. Initially, the wire ring was circular in transverse cross-section. Flattening may be done, for example, by forming a recess in a plate having a base matching the lower regions of the wire and which allows extrusion of the wire in midregions, and which exposes the upper regions to a tool which flattens them to the shape illustrated. After preflattening the wire ring retained a generally circular cross-section in its lower region, except that it had a flattened surface lying in a common flat plane around the annulus. That flat plane was substantially parallel with the upper surface of the gasket body. The length of the flattened wire surface in a radial plane perpendicular to the surface of the flattened annulus was 0.039 inch (as represented by line 50 in FIG. 3). Thus it is seen that the footprint of surface 50 (facing the head) will be greater than the footprint of the surface 52 at the opposite lower side of the wire ring 40 (facing the engine block).

Figure 5:
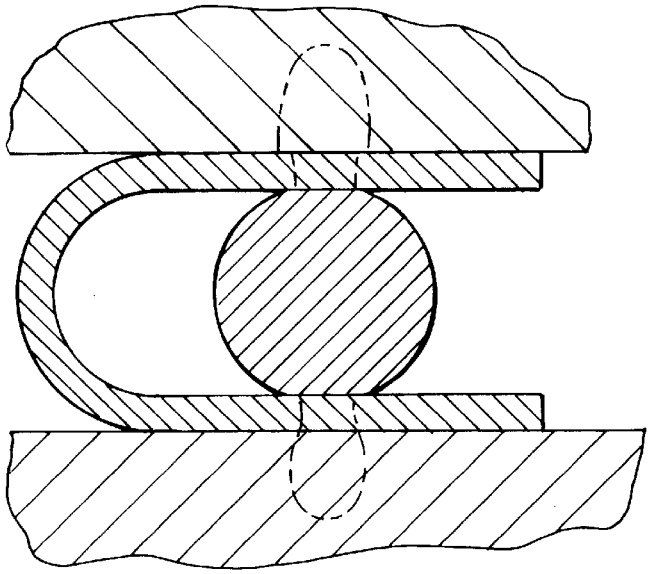
FIG. 5 s a stress diagram showing the stress pattern in an aluminum cylinder head and a cast iron cylinder block with a gasket having a round prior art wire ring.
Figure 6:
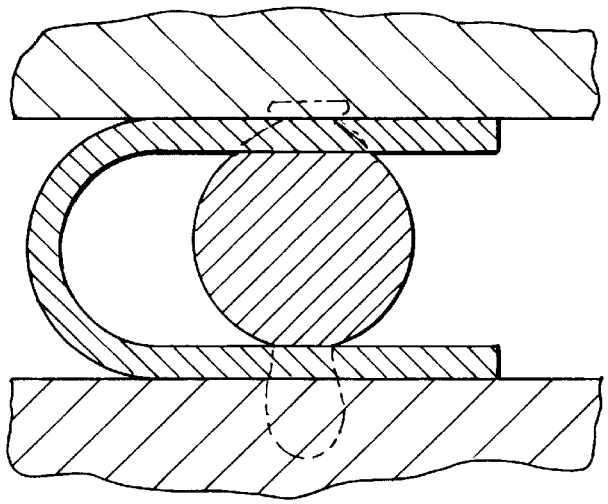
FIG. 6 is a stress diagram similar to that of FIG. 5, but showing the stress pattern in an aluminum cylinder head and a cast iron cylinder block with a gasket having a preflattened wire ring in accordance with the present invention.

FIGS. 5 and 6 are representational stress diagrams showing equivalent stress patterns in aluminum heads and cast iron blocks employing round wires of about 0.045 inch SAE 1006 carbon steel (FIG. 5) and a preflattened 0.045 inch SAE 1006 carbon steel wire.

As shown by FIG. 5, a gasket employing a conventional round wire (0.045 inch in diameter), at a load of 1003 pounds per linear inch (PLI), produced zones at both the head side and the block side of substantially equal stresses and at a relatively high computer finite element analysis Von Mises value of from 48.6 ksi to 57.4 ksi (1 ksi=1000 pounds per square inch) applied by the armor to the head and block. Both resulted in Von Mises stress values in the confronting head and block of about 30.9 ksi to 35.3 ksi, an undesirably high stress for an aluminum head.

As shown by FIG. 6, a gasket employing a flattened wire in accordance with the present invention (initially a 0.045 wire was preflattened to provide a flat at the upper surface of about 0.026 inch). It was loaded at a load of 1009 pounds per linear inch. At the block, the Von Mises stress value in the armor facing the block was about 47.8 ksi to 56.5 ksi, like that shown in FIG. 5 and the Von Mises stress value in the block was about 26.1 to 30.4 ksi. However, the Von Mises stress applied by the armor to the head was about 8.7 ksi to 13 ksi and the stress value in the head was in the range of 13 ksi, enough to provide a good seal but low enough to avoid deleterious stressing of the head.

It was also determined that when the same percentage of available load for sealing a head to a block was applied to a gasket using, respectively, a round wire and a preflattened wire, as in accordance with the showings of FIGS. 5 and 6, that the round wire not only tends to excessively indent and stress the head, but it also produces greater deflection of the head than does the preflattened wire of the present invention. Greater deflection, over a period of time, will tend to deteriorate the seal. Thus, by way of example, using a 0.045 inch round wire, as compared to a 0.045 inch preflattened wire, the deflection of the aluminum head at the wire high points (at about the center) were about 0.00009 inch in the case of the round wire and only about 0.00002 inch in the case of the preflattened wire, as illustrated by FIG. 7, where the 0.045 inch wire under consideration has a two-inch radius at its center and an inner radius of about 1.98 inches and an outer radius of about 2.025 inches.

Thus, FIGS. 5–7 demonstrate that the preflattened wire ring of the present invention produces an effective seal at an aluminum head and resists over-compression, yet does not deleteriously indent or embed into the softer aluminum cylinder head mating surface. The combustion seal provides mating flange conformability during initial cylinder head to cylinder block assembly. It provides a wide flat surface, unlike that of prior art wire rings, which more uniformly distributes the loading stresses at the aluminum head, thus helping to resist over-compression and minimizing the tendency of the wire ring to embed into the mating aluminum cylinder head, all while minimizing undesirable head deflection. The wire ring also provides a stiff sealing member which acts as a stopper to resist over-compression in localized high stress areas.

It will be apparent to those skilled in the art that modifications may be made without departing from the spirit and scope of the invention. Accordingly, it is intended that the invention shall not be considered to be limited, except as may be dictated by the appended claims.

What is claimed is:

1. A head gasket comprising:
   a gasket body defining a main body and at least one combustion opening for surrounding an engine cylinder, a combustion seal in each said combustion opening for surrounding said engine cylinder and for sealing an engine head to an engine block, said combustion seal comprising a wire sealing ring, said sealing ring being generally circular and having an upper surface for facing said engine head and a lower surface for facing said engine block, said upper surface being substantially preflattened and being substantially flatter than the lower surface of said sealing ring.

2. A head gasket in accordance with claim 1, and wherein said combustion seal further comprises armoring ensheathing said wire sealing ring and securing said wire sealing ring in said combustion opening.

3. A head gasket for sealing confronting surfaces of a head and a block around a combustion cylinder,
   a generally flat laminated gasket body having a central core and facing layers on each side of said core, said gasket body defining a plurality of openings including at least one combustion opening for surrounding said combustion cylinder, and, secured in said combustion opening, a fire ring, and said fire ring comprising a sealing ring having a preflattened upper surface for facing said head and a lower surface, said lower surface being generally curvilinear in cross-section and said upper surface being generally flat in cross-section.

4. A head gasket in accordance with claim 3, and wherein said fire ring further comprises a generally U-shaped armor ensheathing said wire sealing ring.

5. A method of making a head gasket for an internal combustion engine, comprising the steps of:
   providing a head gasket body having upper and lower sealing surfaces and defining a combustion opening therein,
   providing a generally circular annular wire ring for surrounding said combustion opening,
   preflattening the upper surface of said annular wire sealing ring while preventing the lower surface of said annular wire sealing ring from like flattening, and
   disposing said preflattened ring in said combustion opening, whereby said wire ring upper surface lies in a plane which is generally parallel to the upper sealing surface of said gasket body.

6. The method of claim 5, and wherein said preflattening step comprises preflattening said upper wire surface to a flatness which is at least ten percent greater than the flatness which would be produced by loading a like circular wire at maximum load in the application in which the head gasket is to be used.

7. The method of claim 6, and wherein said step of disposing comprises ensheathing said preflattened ring in an armor and then positioning said ensheathed preflattened ring in said combustion opening.

8. The method of claim 5, and wherein said step of preflattening preflattens the upper wire surface to a transverse length which is at least equal to 25% of the diameter of the circular annular wire.

9. A head gasket comprising:
   a) a gasket body having a main body and at least one opening;
   b) armoring in the at least one opening, the armoring comprising a wire ring;
   c) the wire ring having an upper surface and a lower surface, the upper the first surface being pre-flattened, and the lower surface being rounded.

10. The head gasket of claim 9 wherein said upper surface of the wire ring is flatter than the lower surface of the wire ring.

11. The head gasket of claim 9 wherein the opening is a combustion opening.

12. The head gasket of claim 9 wherein the wire ring has a preflattened portion and the preflattened portion has a transverse length of at least 25% of the diameter of the wire ring.

13. A method of using a head gasket comprising the steps:
   a) providing an engine having a first portion and a second portion, the first portion being softer than the second portion;
   b) disposing a head gasket between the first portion and the second portion, the head gasket comprising at least one opening and having armoring in the at least one opening, the armoring comprising a wire ring, the wire ring having an first surface and a second surface, the first surface being pre-flattened;

c) orienting the head gasket such that the first surface is facing the first portion, and the second surface is facing the second portion.

14. The method of claim 13, wherein the first portion of the engine is an aluminum head and the second portion of the engine is an engine block.

* * * * *